United States Patent Office 3,163,620
Patented Dec. 29, 1964

3,163,620
COMPOSITIONS CONTAINING POLYETHER-POLYTHIOETHERS AS PLASTICIZERS
Hanswilli von Brachel, Cologne-Sulz, Willi Wolff, Cologne-Mulheim, Hans Holtschmidt, Cologne-Stammheim, and Wilhelm Göbel, Cologne-Flittard, Germany, assignors to Farbenfabriken Bayer Aktiengesellschaft, Leverkusen, Germany, a corporation of Germany
No Drawing. Filed Apr. 4, 1961, Ser. No. 100,529
Claims priority, application Germany Apr. 6, 1960
8 Claims. (Cl. 260—30.8)

So-called plasticisers are of particular importance in the processing of natural and synthetic elastomers. These plasticisers, for example mineral oils, are sometimes used as extenders. Compounds having a synthetic base, such as esters of phthalic, phosphoric or adipic acid, improve the impact elasticity (rebound elasticity) and the resistance to low temperature of vulcanisates and for this reason are frequently called elasticising agents.

The plasticising and elasticising properties of these compounds are probably due to their capacity of initially swelling or softening the elastomers. Since this softening power generally decreases with increasing molecular weight of the plasticisers, attempts were made to employ low molecular weight compounds as plasticisers. However, the increase in the softening power is counteracted by the greater volatility of the compounds of relatively low molecular weight.

Therefore, the plasticisers at present on the market represent a compromise between the desired elasticising and plasticising action on the one hand and the desired volatility on the other hand.

It has now been found that polyether polythioethers of the general Formula 1

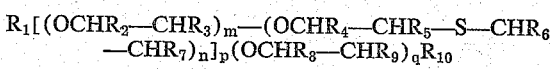

Formula 1 in which $R_1$ and $R_{10}$ each represent a hydrogen atom, a cycloalkyl, acyl or aryl radical or preferably an alkyl radical containing from 1 to 22 carbon atoms; $R_2$ to $R_9$ each represent a hydrogen atom or an alkyl, cycloalkyl or aryl radical; $m$ and $q$ are integers from 0 to 50 and $n$ and $p$ are integers from 1 to 50, are excellent plasticisers for natural and synthetic elastomers and for thermoplastic compositions. They have a low volatility in the elastomers with good plasticising and elasticising properties and at the same time are compatible with thermoplastic compositions.

Compounds of the general Formula 1 may be prepared by condensing a $\beta,\beta'$-dihydroxy alkyl sulphide with a polyalkylene glycol and/or alcohol according to the process described in United States patent specification No. 2,582,605. Preferred polyether polythioethers of the general Formula 1 are those having terminal alkyl groups, such as those obtained by condensing a dihydroxy alkyl sulphide with an aliphatic alcohol.

Particularly preferred polyether polythioethers are obtained by condensing a dihydroxy alkyl sulphide with an oxalkylated aliphatic alcohol in the presence of an acid or a compound having an acid reaction or which will form an acid under the reaction conditions. The polyether polythioethers formed in this way have the following general Formula 2:

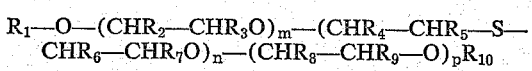

Formula 2 in which $R_1$ and $R_{10}$ each represent a linear or branched alkyl radical containing from 1 to 22 and preferably from 3 to 18 carbon atoms; $R_2$, $R_3$, $R_4$, $R_5$, $R_6$, $R_7$, $R_8$ and $R_9$, which may be the same or different, each represent a hydrogen atom or a linear or branched alkyl radical containing from 1 to 12 carbon atoms; and $m$, $n$ and $p$ are integers from 1 to 10 and preferably from 1 to 5.

The following are examples of aliphatic alcohols which can be reacted either as such or after oxalkylation with dihydroxy alkyl sulphides:

n- and iso-propanol, n- and iso-butanol, 1-hexanol, 2-ethyl-1-hexanol, 1-dodecanol and 1-octadecanol. Suitable oxalkylated alcohols are the reaction products of the aforementioned alcohols with from 1 to 10 mols of ethylene oxide, propylene oxide, butylene oxide or decylene oxide, as well as those oxalkylated alcohols obtained by conversion with several of these or similar alkylene oxides.

Examples of suitable dihydroxy alkyl sulphides are thiodiglycol, $\beta,\beta'$-dimethyl thiodiglycol, $\beta$-ethyl thiodiglycol, $\beta,\beta'$-diethyl thiodiglycol and dihydroxy alkyl sulphides which are formed by condensing the aforementioned dihydroxy alkyl sulphides (e.g. 1,11-dihydroxy-(3,9-dithio-6-oxa)-undecane) with themselves.

Examples of acids which catalyse the condensation of the alcohols with the dihydroxy alkyl sulphides are p-toluene sulphonic acid, orthophosphoric acid, pyrophosphoric acid, metaphosphoric acid, phenyl phosphoric acid, diphenyl phosphoric acid and phosphoric acid monophenyl ester. Examples of acidly reacting substances which catalyse the condensation are ammonium phosphate, potassium bisulphate and sodium phosphate. Examples of substances which split off acids or which form acids under the reaction conditions are triethyl phosphate, methyl toluene sulphonate and dimethyl sulphate.

The alcohol and the dihydroxy alkyl sulphide (preferably in a molar ratio of from 5:1 to 2:5) are heated in the presence of from 0.1 to 1.5% of the acid, acidly reacting substance, or acid-forming substance to a temperature of from 70° C. to 220° C. and preferably to a temperature of from 140° C. to 200° C. (if necessary under reduced pressure), preferebly until practically all the OH groups of the dihydroxy alkyl sulphide are etherified. The product is then neutralised and any unreacted starting material is washed out or distilled off.

The polyether polythioethers obtained in this way generally have a molecular weight of from 200 to 1200, those having a molecular weight of from 250 to 600 being particularly preferred. The desired molecular weight is achieved by regulation of the degree of oxalkylation of the alcohols ($m$ and $p$ of Formula 2) and by suitable adjustment of the ratio between the reactants.

The polyether polythioethers thus prepared are generally mixed with the elastomers in the usual manner for the preparation of mixtures, for example in a kneader or on a roller, in an amount of from 1 to 50 parts by weight and preferably in an amount of from 3 to 35 parts by weight per 100 parts by weight of the polymer. They can be added to all conventional elastomers, such as natural rubber, poly-cis-1,4-isoprene, polybutadiene, polychloroprene and copolymers of butadiene with styrene or acrylonitrile. Furthermore any of the additives usually employed in the rubber-processing industry, such as fillers, anti-oxidants, vulcanizing agents and accelerators, may be added to the mixtures of the new plasticisers and the elastomers. Examples of thermoplastic compositions to which the new plasticisers may be added are polymers and copolymers of ethylene, propylene, vinyl chloride, vinylidene chloride, styrene or cellulose esters.

The polyether polythioethers are excellent plasticisers, in that in the case of synthetic elastomers they combine an excellent plasticising action in the crude mixture with a strong increase in the impact elasticity and a distinct improvement in the low temperature resistivity of the vulcanisates with minimum volatility. In addition, they have a high chemical resistance. Their vulcanisates have a relatively high resistance to swelling, so that they are superior to other plasticisers particularly in the case of butadiene-acrylonitrile copolymers.

When used as plasticisers for thermoplastic compositions the polyether polythioethers meet the standards which are required of a plasticiser and have an antistatic action substantially better than the prior known plasticisers for thermoplastic compositions. They can be worked in an excellent manner with the polymers and have a high plasticising effect. With a low volatility comparable to normal commercial monoplasticisers, they impart a very good resistance to cold to the compositions plasticised therewith, have extremely good compatibility with other plasticisers and stabilizers and are unobjectionable physiologically. As compared with the usual commercial plasticisers they reduce the specifice volume resistance of thermoplastic compositions by $10^3$ and the surface resistance by $10^4$.

EXAMPLE 1

Vulcanisates were prepared by mixing the following ingredients on a roller and by subsequent vulcanisation at 151° C. for 30 minutes.

100 parts by weight of butadiene-acrylonitrile copolymer (33% acrylonitrile, Defo value 1000)
5 parts by weight of zinc oxide
1 part by weight of stearic acid
1 part by weight of phenyl-α-naphthylamine
10 parts by weight of active carbon black
40 parts by weight of inactive carbon black
20 parts by weight of plasticiser (see Table 1)
1.8 parts by weight of sulphur
1 part by weight of N-diethyl-2-benzthiazyl sulphenamide The results are set out in Table 1.

or NaOH), 213 parts by weight of thiodiglycol and 5.2 parts by weight of orthophosphoric acid are heated at 185° C. for 30 hours at 760 mm., for 8 hours at 120 mm. and for 8 hours at 15 mm. pressure in a distillation apparatus while passing through carbon dioxide. About 90 parts by weight of water are thereby distilled off. The phosphoric acid is then neutralised with dilute sodium hydroxide solution at a temperature of from 80° C. to 90° C. and the reaction material is blown for 4 to 5 hours with steam at 120° C. in vacuo. The material is thereafter heated at 0.1 mm. until the sump temperature rises to 110° C. From 600 to 650 parts by weight of a thinly liquid oil are obtained as residue. The salts are filtered off from the oil by suction and the oil is then added to the aforementioned mixture. This oil consists mainly of a compound of the formula $$n-C_4H_9-O-(CH_2-CH_2-O-)_2CH_2-CH_2-S\\-CH_2-CH_2-O-(CH_2-CH_2-O-)_2n-C_4H_9$$

but contains further similar compounds. The entire product is characterised by the arithmetical formula $$n-C_4H_9-O-(CH_2-CH_2-O-)_2-(CH_2-CH_2-S\\-CH_2-CH_2-O-)_{1.05}(CH_2-CH_2-O-)_2n-C_4H_9$$

EXAMPLE 2

Vulcanisates were prepared by mixing the following ingredients on a roller and by subsequent vulcanisation at 151° C. for 30 minutes.

100 parts by weight of polychloroprene rubber with low tendency to crystallisation (Defo value 300)
10 parts by weight of active carbon black
40 parts by weight of inactive carbon black
1 part by weight of stearic acid
1 part by weight of phenyl-α-naphthylamine
20 parts by weight of plasticiser (see Table 2)
4 parts by weight of magensium oxide
5 parts by weight of zinc oxide
0.5 part by weight of mercaptoimidazole

*Table 1*

| Plasticiser | Impact elasticity according to Schoob at 20° C. in percent (DIN 53512) | Dynamic coagulation temperature, ° C. | Loss in weight of the vulcanisate at 125° C. in percent after— | | |
|---|---|---|---|---|---|
| | | | 3 days | 6 days | 9 days |
| Dibutyl phthalate (for comparison) | 32 | −29 | 8.9 | 10.4 | 12.6 |
| Tricresyl phosphate (for comparison) | 28 | −24 | 1.6 | 2.1 | 2.7 |
| Dibenzylether (for comparison) | | −35 | 15.2 | 16.3 | 17.6 |
| Condensate of diethylene glycol mono butyl ether and thiodiglycol | | −35 | 1.7 | 2.0 | 2.2 |

The results are set out in Table 2.

*Table 2*

| Plasticiser | Impact elasticity according to Schoob at 20° C. in percent (DIN 53512) | Dynamic coagulation temperature, ° C. | Loss in weight of the vulcanisate at 125° C. in percent after— | | |
|---|---|---|---|---|---|
| | | | 3 days | 6 days | 9 days |
| a) Dibutyl phthalate (for comparison) | 58 | −42 | 10.7 | 11.9 | 12.2 |
| b) Trihexyl phosphate (for comparison) | 45 | −40 | 2.5 | 4.0 | 4.9 |
| c) Dibenzylether (for comparison) | 48 | −42 | 9.2 | 9.5 | 9.6 |
| d) Condensate according to Example 1 | 51 | −44 | 1.2 | 1.8 | 2.0 |
| e) Condensate of 2 mol diethylene glycol monoisobutyl ether and 1.05 mol thiodiglycol, prepared as described in Example 1 | 52 | −46 | 1.2 | 1.7 | 1.9 |

The condensate used according to the invention was prepared as follows:

531 parts by weight of diethylene glycol monobutyl ether (prepared by the oxethylation of n-butanol with 2 mols of ethylene oxide in the presence of sodium butylate The condensate used under e) consisting mainly of a compound of the formula $$iso-C_4H_9-O-(CH_2-CH_2-O-)_2CH_2-CH_2-S\\-CH_2-CH_2-O-(CH_2-CH_2-O-)_2iso-C_4H_9$$

but contains further similar compounds. The entire product is characterised by the arithmetical formula iso—$C_4H_9$—O—($CH_2$—$CH_2$—O—)$_2$—($CH_2$—$CH_2$—S—$CH_2$—$CH_2$—O—)$_{1.05}$($CH_2$—$CH_2$—O—)$_2$iso$C_4H_9$

EXAMPLE 3

Batches of 60 parts by weight of a polyvinyl chloride having a K value of 70 and which had been prepared by emulsion polymerisation are each mixed with 40 parts by weight of an antistatic plasticiser as indicated below with the addition of 0.6% (based on the PVC) of an organotin compound as stabiliser on a roller at a temperature of 160° C. and for 10 minutes. The rolled sheet is then pressed at 160° C. into foils from which test elements are prepared.

The electrical values (specific volume resistance $\rho_D$, surface resistance $R_0$) are determined at 22° C. and 55% relative air humidity according to VDE 0303/3.

The following plasticisers are added to each batch of polyvinyl chloride:

(a) A condensate of thiodiglycol and diethylene glycol monobutylether, prepared as described in Example 1.

The following normal commercial antistatic plasticisers were used for purposes of comparison:

(b) A polyglycol ester of fatty acids of medium chain length.
(c) Oleic acid polyglycol ester.

The following non-antistatic plasticiser was also used for comparison purposes:

(d) Dioctyl phthalate

The results are set out in Table 3.

Table 3

| Plasticiser | $\rho_D = a.10^b \Omega.cm.$ | | $R_0 = a.10^b \Omega$ | | Remarks |
|---|---|---|---|---|---|
| | a | b | a | b | |
| a | 1.2 | 7 | 4.2 | 6 | |
| b | 8.0 | 7 | 4.7 | 7 | |
| c | | | | | Immediately migrates. |
| d | 7.5 | 10 | 4.1 | 10 | |

EXAMPLE 4

Separate batches of 60 parts by weight of a polyvinyl chloride having a K value of 70 and which had been prepared by emulsion polymerisation are respectively processed with 30 parts by weight of dioctyl phthalate and 10 parts by weight of one of the antistatic plasticisers indicated below, as described in Example 3, and tested.

The results are set out in Table 4.

The following plasticisers are added to each batch of polyvinyl chloride:

(a) A condensate of thiodiglycol and diethylene glycol monoisobutyl ether, prepared as described in Example 1.

The following is used for comparison purposes:

(b) The compound employed in Example 3b.

The following non-antistatic plasticiser is also used for comparison purposes:

(c) Dioctyl phthalate.

Table 4

| Plasticiser | $\rho_D = a.10^b \Omega.cm.$ | | $R_0 = a.10^b \Omega$ | | Remarks |
|---|---|---|---|---|---|
| | a | b | a | b | |
| a | 1.2 | 8 | 9.2 | 7 | |
| b | 9.0 | 8 | 4.1 | 9 | |
| c | 7.5 | 10 | 4.1 | 10 | |

EXAMPLE 5

Separate batches of 60 parts by weight of a polyvinyl chloride having a K value of 70 and which had been prepared by suspension polymerisation are respectively processed with 35 parts by weight of dioctyl pthalate and 5 parts by weight of one of the antistatic plasticisers set out below, as described in Example 3, and then tested.

The results are set out in Table 5.

The following plasticisers are added to each batch of polyvinyl chloride:

(a) A condensate of 1.1 mol $\beta,\beta'$-dimethyl thiodiglycol and 2 mol triethylene glycol mono-n-butylether, prepared in a manner similar to that described in Example 1.

The following are used for comparison purposes:

(b) The compound employed in Example 3b.
(c) The compound employed in Example 3c.

The following non-antistatic plasticiser was also used for comparison purposes:

(d) Dioctyl phthalate.

Table 5

| Plasticiser | $\rho_D = a.10^b \Omega.cm.$ | | $R_0 = a.10^b \Omega$ | | Remarks |
|---|---|---|---|---|---|
| | a | b | a | b | |
| a | 6.0 | 9 | 2.0 | 9 | |
| b | 4.0 | 10 | 9.2 | 9 | Migrates somewhat. |
| c | | | | | Migrates immediately. |
| d | 1.0 | 11 | 1.6 | 10 | |

The condensate used under (a) consists mainly of a compound of the formula

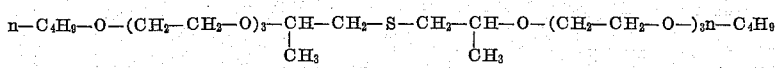

but contains further similar compounds. The entire product is characterised by the arithmetical formula

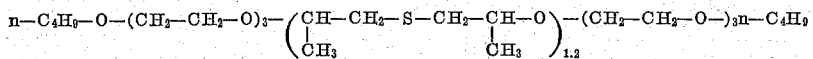

EXAMPLE 6

Separate batches of 60 parts by weight of a polyvinyl chloride having a K value of 70 and which had been prepared by suspension polymerisation are respectively processed with 30 parts by weight of an alkyl sulphonic acid ester of phenol/cresol and 10 parts by weight of one of the antistatic plasticisers set out below, as described in Example 3, and tested.

The results are set out in Table 6.

The following plasticisers are added to each batch of polyvinyl chloride.

(a) A condensate of 1.4 mol of thiodiglycol and 2 mol of pentaethylene glycol monoisohexyl ether, prepared in a manner similar to that described in Example 1.

The following normal commercial antistatic plasticisers are used for comparison purposes:

(b) The compound employed in Example 3b.
(c) The compound employed in Example 3c.

The following non-antistatic plasticiser was also used for comparison purposes:

(d) An alkyl sulphonic acid ester of phenol/cresol.

Table 6

| Plasticiser | $\rho_D = a.10^b \Omega.cm.$ | | $R_0 = a.10^b \Omega$ | | Remarks |
|---|---|---|---|---|---|
| | a | b | a | b | |
| a | 9.3 | 8 | 7.0 | 8 | |
| b | 1.4 | 10 | 8.2 | 9 | |
| c | | | | | Migrates immediately. |
| d | 2.0 | 11 | 2.5 | 10 | |

The condensate used under (a) consists mainly of a compound of the formula

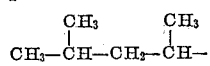
$CH_3-CH-CH_2-CH-O-(CH_2-CH_2-O)_5-CH_2-CH_2-S-CH_2-CH_2-O-(CH_2-CH_2-O)_5-CH-CH_2-CH-CH_3$ (with CH₃ groups)

but contains further similar compounds. The entire product is characterised by the arithmetical formula

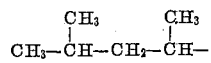
$CH_3-CH-CH_2-CH-O-(CH_2-CH_2-O)_5-(CH_2-CH_2-S-CH_2-CH_2-O)_{1.4}-(CH_2-CH_2-O)_5-CH-CH_2-CH-CH_3$

EXAMPLE 7

Separate batches of 60 parts by weight of a polyvinyl chloride having a K value of 70 which had been prepared by emulsion polymerisation are respectively processed with the plasticisers set out below in the manner described in Example 3. The corresponding test elements were tested and the tensile strength and breaking elongation thereof were determined according to DIN 53 504, the cold behaviour according to VDE 0472 and Schulz and Mahnert, the Shore hardness values in the Brabender apparatus and the volatility at 90° C. after 24, 48 and 72 hours.

The results obtained are set out in Table 7.

The following plasticisers are added to each 60 parts by weight of the polyvinyl chloride:

(a) A condensate of thiodiglycol and diethylene glycol monobutyl ether (prepared in a manner similar to that described in Example 1)

(b) Dioctyl phthalate (c) An alkyl sulphonic acid ester of phenol/cresol.

Table 7

| Plasticiser | Tensile strength, kp/cm² | Breaking elongation, percent | Cold behaviour according to— | |
|---|---|---|---|---|
| | | | VDE 0472, °C. | Schulz and Mehnert, °C. |
| a | 112 | 315 | −40 | −50 |
| b | 122 | 331 | −35 | −40 |
| c | 167 | 325 | −30 | −35 |

| Plasticiser | Shore hardness values | | Volatility in Brabender apparatus | | |
|---|---|---|---|---|---|
| | A | D | 24ʰ | 48ʰ | 72ʰ |
| a | 63 | 22 | 0.8 | 0.9 | 1.0 |
| b | 70 | 25 | 0.4 | 0.6 | 0.8 |
| c | 72 | 27 | 0.6 | 0.9 | 1.3 |

We claim:

1. As a new composition of matter, a polymer which is plasticized by the polyether-polythioether of the formula:

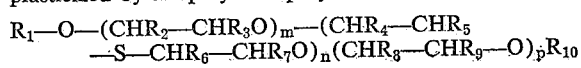
$R_1-O-(CHR_2-CHR_3O)_m-(CHR_4-CHR_5-S-CHR_6-CHR_7O)_n(CHR_8-CHR_9-O)_pR_{10}$ wherein $R_1$ and $R_{10}$ each represents an alkyl radical containing from 1 to 22 carbon atoms; $R_2$ to $R_9$ each represent a member selected from the group consisting of a hydrogen atom and an alkyl radical containing from 1 to 12 carbon atoms and m, n and p are integers from 1 to 10, said polymer being a member selected from the group consisting of natural rubber, poly-cis-1,4-isoprene, polybutadiene, polychloroprene, a cellulose ester, a butadiene-styrene copolymer, a butadiene-acrylonitrile copolymer, and the homopolymers and copolymers of ethylene, propylene, vinyl chloride, vinylidene chloride, and styrene.

2. The composition of claim 1 wherein $R_1$ and $R_{10}$ each represent an alkyl radical containing from 3–18 carbon atoms.

3. The composition of claim 1 wherein m, n and p are integers from 1 to 5.

4. The composition of claim 1 wherein the plasticizer

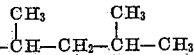
$CH_3-CH-CH_2-CH-O-(CH_2-CH_2-O)_5-CH-CH_2-CH-CH_3$ (with CH₃ groups)

is a condensation product of diethyleneglycol monobutyl ether and thiodiglycol.

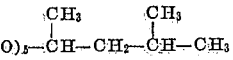

5. The composition of claim 1 wherein the plasticizer is a condensation product of triethyleneglycol monobutyl ether and beta,beta'-dimethyl thiodiglycol.

6. As a new composition of matter, polyvinyl chloride which is plasticized by the polyether-polythioether of the formula:

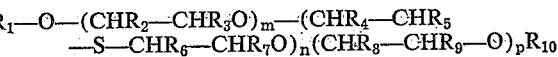
$R_1-O-(CHR_2-CHR_3O)_m-(CHR_4-CHR_5-S-CHR_6-CHR_7O)_n(CHR_8-CHR_9-O)_pR_{10}$ wherein $R_1$ and $R_{10}$ each represents an alkyl radical containing from 1 to 22 carbon atoms; $R_2$ to $R_9$ each represent a member selected from the group consisting of a hydrogen atom and an alkyl radical containing from 1 to 12 carbon atoms and m, n and p are integers from 1 to 10.

7. As a new composition of matter, a butadiene-acrylonitrile copolymer which is plasticized by the polyether-polythioether of the formula:

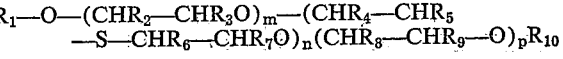
$R_1-O-(CHR_2-CHR_3O)_m-(CHR_4-CHR_5-S-CHR_6-CHR_7O)_n(CHR_8-CHR_9-O)_pR_{10}$ wherein $R_1$ and $R_{10}$ each represents an alkyl radical containing from 1 to 22 carbon atoms; $R_2$ to $R_9$ each represent a member selected from the group consisting of a hydrogen atom and an alkyl radical containing from 1 to 12 carbon atoms and m, n and p are integers from 1 to 10.

8. As a new composition of matter, polychloroprene which is plasticized by the polyether-polythioether of the formula:

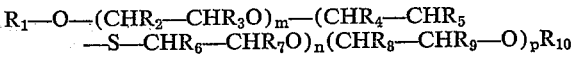
$R_1-O-(CHR_2-CHR_3O)_m-(CHR_4-CHR_5-S-CHR_6-CHR_7O)_n(CHR_8-CHR_9-O)_pR_{10}$ wherein $R_1$ and $R_{10}$ each represents an alkyl radical containing from 1 to 22 carbon atoms; $R_2$ to $R_9$ each represent a member selected from the group consisting of a hydrogen atom and an alkyl radical containing from 1 to 12 carbon atoms and m, n and p are integers from 1 to 10.

References Cited in the file of this patent

UNITED STATES PATENTS

| 2,563,383 | Vaughan et al. | Aug. 7, 1951 |
| 2,582,605 | Richter et al. | Jan. 15, 1952 |
| 2,645,659 | Morris et al. | July 14, 1953 |
| 2,916,519 | Wegner et al. | Dec. 8, 1959 |

FOREIGN PATENTS

| 611,077 | Great Britain | Oct. 25, 1948 |